United States Patent
Clark

(10) Patent No.: US 12,423,688 B2
(45) Date of Patent: Sep. 23, 2025

(54) SYSTEM, METHOD, AND COMPUTER PROGRAM PRODUCT FOR SECURE KEY MANAGEMENT

(71) Applicant: Visa International Service Association, San Francisco, CA (US)

(72) Inventor: Adam Kim Clark, Sterling, VA (US)

(73) Assignee: Visa International Service Association, San Francisco, CA (US)

(*) Notice: Subject to any disclaimer, the term of this patent is extended or adjusted under 35 U.S.C. 154(b) by 177 days.

(21) Appl. No.: 17/761,226

(22) PCT Filed: Sep. 23, 2020

(86) PCT No.: PCT/US2020/052147
§ 371 (c)(1),
(2) Date: Mar. 17, 2022

(87) PCT Pub. No.: WO2021/061724
PCT Pub. Date: Apr. 1, 2021

(65) Prior Publication Data
US 2022/0374885 A1 Nov. 24, 2022

Related U.S. Application Data

(60) Provisional application No. 62/904,006, filed on Sep. 23, 2019.

(51) Int. Cl.
*G06Q 20/38* (2012.01)

(52) U.S. Cl.
CPC ..... *G06Q 20/3829* (2013.01); *G06Q 20/3821* (2013.01)

(58) Field of Classification Search
CPC .................. G06Q 20/3829; G06Q 20/3821
See application file for complete search history.

(56) References Cited

U.S. PATENT DOCUMENTS 9,680,805 B1 * 6/2017 Rodgers .............. H04L 63/0281
9,774,578 B1   9/2017 Ateniese et al.
(Continued)

FOREIGN PATENT DOCUMENTS

AU    2015308608 A1 *  2/2017  .......... H04L 63/061
CN       110463155 A  * 11/2019  ............. G06F 21/34
(Continued)

OTHER PUBLICATIONS

"Cloud External Key Manager", Cloud External Key Manager | Google Cloud, retrieved Jun. 25, 2020, 12 pages.
(Continued)

*Primary Examiner* — Neha Patel
*Assistant Examiner* — Davida Lee King
(74) *Attorney, Agent, or Firm* — The Webb Law Firm

(57) ABSTRACT

Provided are computer implemented systems, methods, and computer program products for secure key management, including receiving, by a remote data storage service, a request for data stored as encrypted data by the remote data storage service, the request initiated by a first entity, transmitting, to a first multi-party computation (MPC) server controlled by the first entity, an MPC request, receiving an MPC response from the first MPC server including a secret generated by a secure cryptoprocessor, and decrypting the encrypted data based at least partially on the MPC response. The computer implemented systems, methods, and computer program products may include blocking at least one of a subsequent MPC request from the data storage service, a subsequent MPC response to the data storage service, a link, or a connection between the data storage service and an MPC server computer of the entity to prevent decryption.

18 Claims, 6 Drawing Sheets

(56) References Cited

U.S. PATENT DOCUMENTS

| | | |
|---|---|---|
| 2012/0233460 A1 | 9/2012 | Kamara et al. |
| 2015/0113266 A1 | 4/2015 | Wooten et al. |
| 2016/0065370 A1 | 3/2016 | Le Saint et al. |
| 2016/0292430 A1 | 10/2016 | Antonopoulos et al. |
| 2018/0054316 A1 | 2/2018 | Tomlinson et al. |
| 2018/0357427 A1 | 12/2018 | Lindell et al. |
| 2018/0373882 A1 | 12/2018 | Veugen |
| 2019/0222414 A1 | 7/2019 | Peer et al. |
| 2020/0034550 A1* | 1/2020 | Kim .................. H04L 9/085 |
| 2021/0051001 A1* | 2/2021 | Li .................. H04L 9/0869 |

FOREIGN PATENT DOCUMENTS

| | | | |
|---|---|---|---|
| WO | WO-2013131631 A1 * | 9/2013 | ........ G06Q 20/385 |
| WO | 2020068038 A1 | 4/2020 | |

OTHER PUBLICATIONS

"Managing Cloud EKM keys", https://cloud.google.com/kms/docs/managing-external-keys. retrieved Jun. 25, 2022, 6 pages.

* cited by examiner

SYSTEM, METHOD, AND COMPUTER PROGRAM PRODUCT FOR SECURE KEY MANAGEMENT

CROSS REFERENCE TO RELATED APPLICATIONS

This application is the United States national phase of International Application No. PCT/US2020/052147 filed Sep. 23, 2020, and claims the benefit of U.S. Provisional Patent Application No. 62/904,006, filed on Sep. 23, 2019, the entire disclosures of which are hereby incorporated by reference in their entirety.

BACKGROUND

Technical Field

This disclosure relates generally to data management and, in some non-limiting embodiments or aspects, to systems, methods, and computer program products for controlling encrypted data in remote or distributed systems by multi-party computations to provide secure key management.

Technical Description

With the migration of data to the cloud, businesses attain scalability, ease of use, enhanced collaboration and mobility, and eliminate investment in building and maintaining their own infrastructure. However, the cloud also brings challenges when it comes to information security.

The reward to a hacker for getting into a cloud system is often much greater than getting into a company's local file server. Cloud systems in the aggregate store millions of companies' data, while a local server hosts the data of one company only. For this reason, cloud systems are a much better target for data theft, either externally or from an internal user.

Therefore, maintaining data integrity and security is an ongoing and significant challenge for cloud services and is one of the main concerns with using a cloud provider to host data in the cloud. Encryption plays a critical role in preserving the confidentiality and integrity of data stores in the cloud and significantly reduces the risk of a data breach. When using cloud services, organizations may need to provide an encryption key and/or permit a cloud provider to generate and manage encryption keys on behalf of the organization.

However, not all encryption and encryption keys are the same. For example, many cloud providers fail to ensure the confidentiality of data and, to do so, a cloud provider needs to be designed in a way that at no point can the cloud provider have access to data in the clear. However, the vast majority of cloud providers only provide encryption in transit and at rest. In transit, or channel encryption, means that there is an encrypted channel between you and the server, such as, a secure socket layer or transport layer security (SSL/TLS), but once the information leaves the channel, it is in the clear. Hence, once data arrives at the cloud provider, it can be accessible to a hacker or a rogue employee.

In the case of encryption of data at rest, the cloud provider may encrypt data before storing it. As such, the key(s) may be stored with the cloud provider, and organizations using these cloud-based computing services may rely on the cloud provider to maintain the key(s). However, when the cloud provider also holds the encryption keys to your files, as has happened in the past, system administrators, those who hack the cloud systems, or those who have access to or come into possession of an administrator's password, may be able to access and read secure files.

The confidentiality of data can only be guaranteed when the cloud provider uses end-to-end encryption. With end-to-end encryption based on zero-knowledge authentication methods, cloud providers know nothing about the data stored on their servers. In case of a breach of the cloud systems, data would remain secure, as hackers would not be able to recover the key to decrypt data. However, cloud provider employees who operate the cloud would also be unable to access the data.

Moreover, such zero-knowledge methods may prove too restrictive, and can thwart opportunities to use the data for business purposes, such as, in transactional systems which necessarily consume data during operation. In addition, if an organization decides to leave the cloud provider, there is no technical assurance that the cloud provider will not access the encrypted data or keys. As such, once the organization decides to no longer use the cloud provider services of the cloud provider, companies may be reliant on the cloud provider to delete the data, or at least continue to protect it.

SUMMARY

Accordingly, disclosed are improved computer-implemented systems, methods, and computer program products for controlling encrypted data in remote systems by multi-party computations to provide secure key management.

According to non-limiting embodiments or aspects, provided is a computer-implemented method, comprising: receiving, by a remote data storage service, a request for data stored as encrypted data by the remote data storage service, the request initiated by a first entity; transmitting, to a first multi-party computation (MPC) server controlled by the first entity, an MPC request; receiving an MPC response from the first MPC server including a secret generated by a secure cryptoprocessor; and decrypting, by the remote data storage service, the stored encrypted data based at least partially on the MPC response.

In some non-limiting embodiments or aspects, the computer-implemented method may further include receiving, from a second MPC server controlled by the remote data storage service, a second MPC response, wherein the stored encrypted data is decrypted based at least partially on the second MPC response.

In some non-limiting embodiments or aspects, the computer-implemented method may further include that the MPC request is transmitted to the first MPC server in response to receiving the second MPC response.

In some non-limiting embodiments or aspects, the computer-implemented method may further include that the MPC request is transmitted by the second MPC server to the first MPC server.

In some non-limiting embodiments or aspects, the computer-implemented method may further include that the stored encrypted data includes a master key determined by decrypting the stored encrypted data with a derived key based on the MPC response and the second MPC response to determine the master key associated with the first entity in the remote data storage service.

In some non-limiting embodiments or aspects, the computer-implemented method may further include that the stored encrypted data is decrypted within a predetermined period without revealing any information about the MPC request or the MPC response, and wherein the MPC response is configured to remain active for a period not exceeding the predetermined period to minimize exposure.

In some non-limiting embodiments or aspects, the computer-implemented method may further include that the secret includes a key, a code, a token, a pin, a computation, or a password, and the method further comprises receiving, from a second MPC server controlled by one of a transaction terminal, an issuer bank, or an acquirer bank, a second MPC response, wherein the stored encrypted data is decrypted based at least partially on the second MPC response.

In some non-limiting embodiments or aspects, the computer-implemented method may further include that the remote data storage service is configured to decrypt based on a predetermined number of MPC responses of the first entity.

In some non-limiting embodiments or aspects, the computer-implemented method may further include transmitting one or more MPC requests to a plurality of MPC servers associated with the first entity.

In some non-limiting embodiments or aspects, the computer-implemented method may further include determining a multi-party computation after receiving one or more MPC responses from the plurality of MPC servers, wherein the stored encrypted data is decrypted based on the received MPC responses satisfying the predetermined number of MPC responses.

In some non-limiting embodiments or aspects, the computer-implemented method may further include determining, by the first entity, whether to prevent the remote data storage service from decrypting the stored encrypted data of the first entity.

In some non-limiting embodiments or aspects, the computer-implemented method may further include blocking at least one of a subsequent MPC request from the remote data storage service, a subsequent MPC response to the remote data storage service, or a connection between the remote data storage service and an MPC server of the first entity to prevent decryption.

In some non-limiting embodiments or aspects, the computer-implemented method may further include that the secret is wrapped with a transient layer of encryption based on a transient key while being generated by the secure cryptoprocessor.

According to non-limiting embodiments or aspects, provided is a system for secure key management, comprising: at least one processor programmed or configured to: receive, by a remote data storage service, a request for data stored as encrypted data by the remote data storage service, the request initiated by a first entity; transmit, to a first multi-party computation (MPC) server controlled by the first entity, an MPC request; receive an MPC response from the first MPC server including at least a secret generated by a secure cryptoprocessor; and decrypt, by the remote data storage service, the stored encrypted data based at least partially on the MPC response.

In some non-limiting embodiments or aspects, the computer-implemented method may further include that the remote data storage service is configured to decrypt, based on a predetermined number of MPC responses from an MPC server of a point-of-sale (POS) terminal, an MPC server of an issuer bank, an MPC server of a transaction handler, or an MPC server of an acquirer bank.

According to non-limiting embodiments or aspects, provided is a system comprising: (a) at least one server computer under control of a data storage service, the at least one server computer in communication with at least one data storage device comprising encrypted data associated with an entity; (b) a first MPC server computer in communication with the at least one server computer, the first MPC server computer under control of the data storage service, the first MPC server computer programmed or configured to: (i) receive, from the at least one server computer, a first MPC request, (ii) generate a first MPC response based on the first MPC request, including a secret generated by a secure cryptoprocessor, and (iii) transmit the first MPC response to the at least one server computer; and (c) a second MPC server computer in communication with the at least one server computer, the second MPC server computer under control of the entity and not controlled by the data storage service, the second MPC server computer programmed or configured to: (i) receive, from the at least one server computer or the first MPC server computer, a second MPC request, (ii) generate a second MPC response based on the second MPC request, and (iii) transmit the second MPC response to the at least one server computer, and the at least one server computer is programmed or configured to decrypt the encrypted data based at least partially on the first MPC response and the second MPC response.

In some non-limiting embodiments or aspects, the key encryption system may further include the stored encrypted data that includes a master key determined by the at least one server computer decrypting the stored encrypted data with a derived key based on the first MPC response and the second MPC response to determine the master key associated with the entity.

In some non-limiting embodiments or aspects, the key encryption system may further include that the stored encrypted data is decrypted within a predetermined period without revealing any information about the first MPC request or the first MPC response, and wherein the first MPC response is configured to remain active for a period not exceeding the predetermined period to minimize exposure.

In some non-limiting embodiments or aspects, the key encryption system may further include a third MPC server controlled by one of a transaction terminal, an issuer bank, or an acquirer bank, wherein the at least one computer is further configured to receive a third MPC response from the third MPC server, and wherein the stored encrypted data is decrypted based at least partially on the third MPC response.

In some non-limiting embodiments or aspects, the key encryption system may further include that the first MPC server comprises a hardware security module configured to generate the MPC response in a secure cryptoprocessor.

In some non-limiting embodiments or aspects, the key encryption system may be further configured to transmit one or more MPC requests to a plurality of MPC server computers associated with the entity; and the key encryption system may be further configured to determine an MPC after receiving one or more MPC responses from the plurality of MPC server computers, wherein the encrypted data is decrypted based on the received MPC responses satisfying the predetermined number of MPC responses.

In some non-limiting embodiments or aspects, the key encryption system may further include a second MPC server computer that is further programmed or configured to: determine whether to prevent the data storage service from decrypting the stored encrypted data of the entity.

In some non-limiting embodiments or aspects, the key encryption system may be further configured to block at least one of a subsequent MPC request from the data storage service, a subsequent MPC response to the data storage service, or a connection between the data storage service and an MPC server computer of the entity to prevent decryption.

In some non-limiting embodiments or aspects, the key encryption system may be further configured to the secret that is wrapped with a transient layer of encryption based on a transient key while being generated by the secure cryptoprocessor.

According to non-limiting embodiments or aspects, provided is a computer program product for secure key management comprising at least one non-transitory computer-readable medium including one or more instructions that, when executed by at least one processor, cause the at least one processor to: receive, by a remote data storage service, a request for data stored as encrypted data by the remote data storage service, the request initiated by a first entity; transmit, to a first multi-party computation (MPC) server controlled by the first entity, an MPC request; receive an MPC response from the first MPC server including a secret that is generated by a secure cryptoprocessor; and decrypt, by the remote data storage service, the stored encrypted data based at least partially on the MPC response.

Further non-limiting embodiments or aspects are set forth in the following numbered clauses:

Clause 1: A computer-implemented method, comprising: receiving, by a remote data storage service, a request for data stored as encrypted data by the remote data storage service, the request initiated by a first entity; transmitting, to a first multi-party computation (MPC) server controlled by the first entity, an MPC request; receiving an MPC response from the first MPC server including a secret generated by a secure cryptoprocessor; and decrypting, by the remote data storage service, the stored encrypted data based at least partially on the MPC response.

Clause 2: The computer-implemented method of clause 1, further comprising: receiving, from a second MPC server controlled by the remote data storage service, a second MPC response, wherein the stored encrypted data is decrypted based at least partially on the second MPC response.

Clause 3: The computer-implemented method of clauses 1 or 2, wherein the MPC request is transmitted to the first MPC server in response to receiving the second MPC response.

Clause 4: The computer-implemented method of any of clauses 1-3, wherein the MPC request is transmitted by the second MPC server to the first MPC server.

Clause 5: The computer-implemented method of any of clauses 1-4, wherein the stored encrypted data includes a master key determined by decrypting the stored encrypted data with a derived key based on the MPC response and the second MPC response to determine the master key associated with the first entity in the remote data storage service.

Clause 6: The computer-implemented method of any of clauses 1-5, wherein the stored encrypted data is decrypted within a predetermined period without revealing any information about the MPC request or the MPC response, and wherein the MPC response is configured to remain active for a period not exceeding the predetermined period to minimize exposure.

Clause 7: The computer-implemented method of any of clauses 1-6, wherein the secret includes a key, a code, a token, a pin, a computation, or a password, and the method further comprises receiving, from a second MPC server controlled by one of a transaction terminal, an issuer bank, or an acquirer bank, a second MPC response, wherein the stored encrypted data is decrypted based at least partially on the second MPC response.

Clause 8: The computer-implemented method of any of clauses 1-7, wherein the remote data storage service is configured to decrypt based on a predetermined number of MPC responses of the first entity, wherein the method further comprises: transmitting one or more MPC requests to a plurality of MPC servers associated with the first entity; and determining an MPC after receiving one or more MPC responses from the plurality of MPC servers, wherein the stored encrypted data is decrypted based on the received MPC responses satisfying the predetermined number of MPC responses.

Clause 9: The computer-implemented method of any of clauses 1-8, further comprising: determining, by the first entity, whether to prevent the remote data storage service from decrypting the stored encrypted data of the first entity; and blocking at least one of a subsequent MPC request from the remote data storage service, a subsequent MPC response to the remote data storage service, or a connection between the remote data storage service and an MPC server of the first entity to prevent decryption.

Clause 10: The computer-implemented method of any of clauses 1-9, wherein the secret is wrapped with a transient layer of encryption based on a transient key while being generated by the secure cryptoprocessor.

Clause 11: A system for secure key management, comprising: at least one processor programmed or configured to: receive, by a remote data storage service, a request for data stored as encrypted data by the remote data storage service, the request initiated by a first entity; transmit, to a first multi-party computation (MPC) server controlled by the first entity, an MPC request; receive an MPC response from the first MPC server including at least a secret generated by a secure cryptoprocessor; and decrypt, by the remote data storage service, the stored encrypted data based at least partially on the MPC response.

Clause 12: The system for secure key management of clause 11, wherein the at least one processor is further programmed or configured to: receive, from a second MPC server controlled by the remote data storage service, a second MPC response, wherein the stored encrypted data is decrypted based at least partially on the second MPC response.

Clause 13: The system for secure key management of clauses 11 or 12, wherein the MPC request is transmitted to the first MPC server in response to receiving the second MPC response.

Clause 14: The system for secure key management of any of clauses 11-13, wherein the MPC request is transmitted by the second MPC server to the first MPC server.

Clause 15: The system for secure key management of any of clauses 11-14, wherein the stored encrypted data includes a master key determined by the at least one processor decrypting the stored encrypted data with a derived key based on the MPC response and the second MPC response to determine a master key associated with the first entity in the remote data storage service.

Clause 16: The system for secure key management of any of clauses 11-15, wherein the stored encrypted data is decrypted within a predetermined period without revealing any information about the MPC request or the MPC response, and wherein the MPC response is configured to remain active for a period not exceeding the predetermined period to minimize exposure.

Clause 17: The system for secure key management of any of clauses 11-16, wherein the secret includes a key, a code, a token, a pin, a computation, or a password, and the system is further configured to receive, from a second MPC server controlled by one of a transaction terminal, an issuer bank, or an acquirer bank, a second MPC response, wherein the stored encrypted data is decrypted based at least partially on the second MPC response.

Clause 18: The system for secure key management of any of clauses 11-17, further comprising the first MPC server, the first MPC server comprising a hardware security module configured to generate the MPC response in a secure cryptoprocessor.

Clause 19: The system for secure key management of any of clauses 11-18, wherein the remote data storage service is configured to decrypt based on a predetermined number of MPC responses of the first entity, wherein the at least one processor is further programmed or configured to: transmit one or more MPC requests to a plurality of MPC servers associated with the first entity; and determine an MPC after receiving one or more MPC responses from the plurality of MPC servers, wherein the stored encrypted data is decrypted based on the received MPC responses satisfying the predetermined number of MPC responses.

Clause 20: The system for secure key management of any of clauses 11-19, wherein the at least one processor is further programmed or configured to: determine, by the first entity, whether to prevent the remote data storage service from decrypting the stored encrypted data by the first entity; and block at least one of a subsequent MPC request from the remote data storage service, a subsequent MPC response to the remote data storage service, or a connection between the remote data storage service and an MPC server of the first entity.

Clause 21: The system for secure key management of any of clauses 11-20, wherein the secret is wrapped with a transient layer of encryption based on a transient key while being generated by the secure cryptoprocessor.

Clause 22: The system for secure key management of any of clauses 11-21, wherein the remote data storage service is configured to decrypt based on a predetermined number of MPC responses from an MPC server of a point-of-sale (POS) terminal, an MPC server of an issuer bank, an MPC server of a transaction handler, or an MPC server of an acquirer bank.

Clause 23: A system comprising: (a) at least one server computer under control of a data storage service, the at least one server computer in communication with at least one data storage device comprising encrypted data associated with an entity; (b) a first multi-party computation (MPC) server computer in communication with the at least one server computer, the first MPC server computer under control of the data storage service, the first MPC server computer programmed or configured to: (i) receive, from the at least one server computer, a first MPC request, (ii) generate a first MPC response based on the first MPC request including a secret generated by a secure cryptoprocessor, and (iii) transmit the first MPC response to the at least one server computer; and (c) a second MPC server computer in communication with the at least one server computer, the second MPC server computer under control of the entity and not controlled by the data storage service, the second MPC server computer programmed or configured to: (i) receive, from the at least one server computer or the first MPC server computer, a second MPC request, (ii) generate a second MPC response based on the second MPC request, and (iii) transmit the second MPC response to the at least one server computer, wherein the at least one server computer is programmed or configured to decrypt the encrypted data based at least partially on the first MPC response and the second MPC response.

Clause 24: The system of clause 23, wherein the stored encrypted data includes a master key determined by the at least one server computer decrypting the stored encrypted data with a derived key based on the first MPC response and the second MPC response to determine the master key associated with the entity.

Clause 25: The system of clauses 23 or 24, wherein the stored encrypted data is decrypted within a predetermined period without revealing any information about the first MPC request or the first MPC response, and wherein the first MPC response is configured to remain active for a period not exceeding the predetermined period to minimize exposure.

Clause 26: The system of any of clauses 23-25, further comprising a third MPC server controlled by one of a transaction terminal, an issuer bank, or an acquirer bank, wherein the at least one computer is further configured to receive a third MPC response from the third MPC server, and wherein the stored encrypted data is decrypted based at least partially on the third MPC response.

Clause 27: The system of any of clauses 23-26, wherein the first MPC server comprises a hardware security module configured to generate the MPC response in a secure cryptoprocessor.

Clause 28: The system of any of clauses 23-27, wherein the at least one server computer is configured to decrypt based on a predetermined number of MPC responses of the entity, and wherein the at least one server computer is further programmed or configured to: transmit one or more MPC requests to a plurality of MPC server computers associated with the entity; and determine an MPC after receiving one or more MPC responses from the plurality of MPC server computers, wherein the encrypted data is decrypted based on the received MPC responses satisfying the predetermined number of MPC responses.

Clause 29: The system of any of clauses 23-28, wherein the second MPC server computer is further programmed or configured to: determine whether to prevent the data storage service from decrypting the stored encrypted data of the entity; and block at least one of a subsequent MPC request from the data storage service, a subsequent MPC response to the data storage service, or a connection between the data storage service and an MPC server computer of the entity to prevent decryption.

Clause 30: The system of any of clauses 23-29, wherein the secret is wrapped with a transient layer of encryption based on a transient key while being generated by the secure cryptoprocessor.

Clause 31: A computer program product for secure key management comprising at least one non-transitory computer-readable medium including one or more instructions that, when executed by at least one processor, cause the at least one processor to: receive, by a remote data storage service, a request for data stored as encrypted data by the remote data storage service, the request initiated by a first entity; transmit, to a first multi-party computation (MPC) server controlled by the first entity, an MPC request; receive an MPC response from the first MPC server including that a secret is generated by a secure cryptoprocessor; and decrypt, by the remote data storage service, the stored encrypted data based at least partially on the MPC response.

Clause 32: The computer program product for secure key management of clause 31, wherein the at least one processor is further programmed or configured to: receive, from a second MPC server controlled by the remote data storage service, a second MPC response, wherein the stored encrypted data is decrypted based at least partially on the second MPC response.

Clause 33: The computer program product for secure key management of clauses 31 or 32, wherein the MPC request is transmitted to the first MPC server in response to receiving the second MPC response.

Clause 34: The computer program product for secure key management of any of clauses 31-33, wherein the MPC request is transmitted by the second MPC server to the first MPC server.

Clause 35: The computer program product for secure key management of any of clauses 31-34, wherein the stored encrypted data includes a master key determined by the at least one processor decrypting the stored encrypted data with a derived key based on the MPC response and the second MPC response to determine a master key associated with the first entity in the remote data storage service.

Clause 36: The computer program product for secure key management of any of clauses 31-35, wherein the stored encrypted data is decrypted within a predetermined period without revealing any information about the MPC request or the MPC response, and wherein the MPC response is configured to remain active for a period not exceeding the predetermined period to minimize exposure.

Clause 37: The computer program product for secure key management of any of clauses 31-36, wherein the secret includes a key, a code, a token, a pin, a computation, or a password, and the computer program product is further configured to receive, from a second MPC server controlled by one of a transaction terminal, an issuer bank, or an acquirer bank, a second MPC response, wherein the stored encrypted data is decrypted based at least partially on the second MPC response.

Clause 38: The computer program product for secure key management of any of clauses 31-37, further comprising the first MPC server, the first MPC server comprising a hardware security module configured to generate the MPC response in a secure cryptoprocessor.

Clause 39: The computer program product for secure key management of any of clauses 31-38, wherein the remote data storage service is configured to decrypt based on a predetermined number of MPC responses of the first entity, wherein the at least one processor is further programmed or configured to: transmit one or more MPC requests to a plurality of MPC servers associated with the first entity; and determine an MPC after receiving one or more MPC responses from the plurality of MPC servers, wherein the stored encrypted data is decrypted based on the received MPC responses satisfying the predetermined number of MPC responses.

Clause 40. The computer program product for secure key management of any of clauses 31-39, wherein the at least one processor is further programmed or configured to: determine, by the first entity, whether to prevent the remote data storage service from decrypting the stored encrypted data by the first entity; and block at least one of a subsequent MPC request from the remote data storage service, a subsequent MPC response to the remote data storage service, or a connection between the remote data storage service and an MPC server of the first entity.

Clause 41: The computer program product for secure key management of any of clauses 31-40, wherein the secret is wrapped with a transient layer of encryption based on a transient key while being generated by the secure cryptoprocessor.

Clause 42: The computer program product for secure key management of any of clauses 31-41, wherein the remote data storage service is configured to decrypt based on a predetermined number of MPC responses from an MPC server of a point-of-sale (POS) terminal, an MPC server of an issuer bank, an MPC server of a transaction handler, or an MPC server of an acquirer bank.

These and other features and characteristics of the present disclosure, as well as, the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
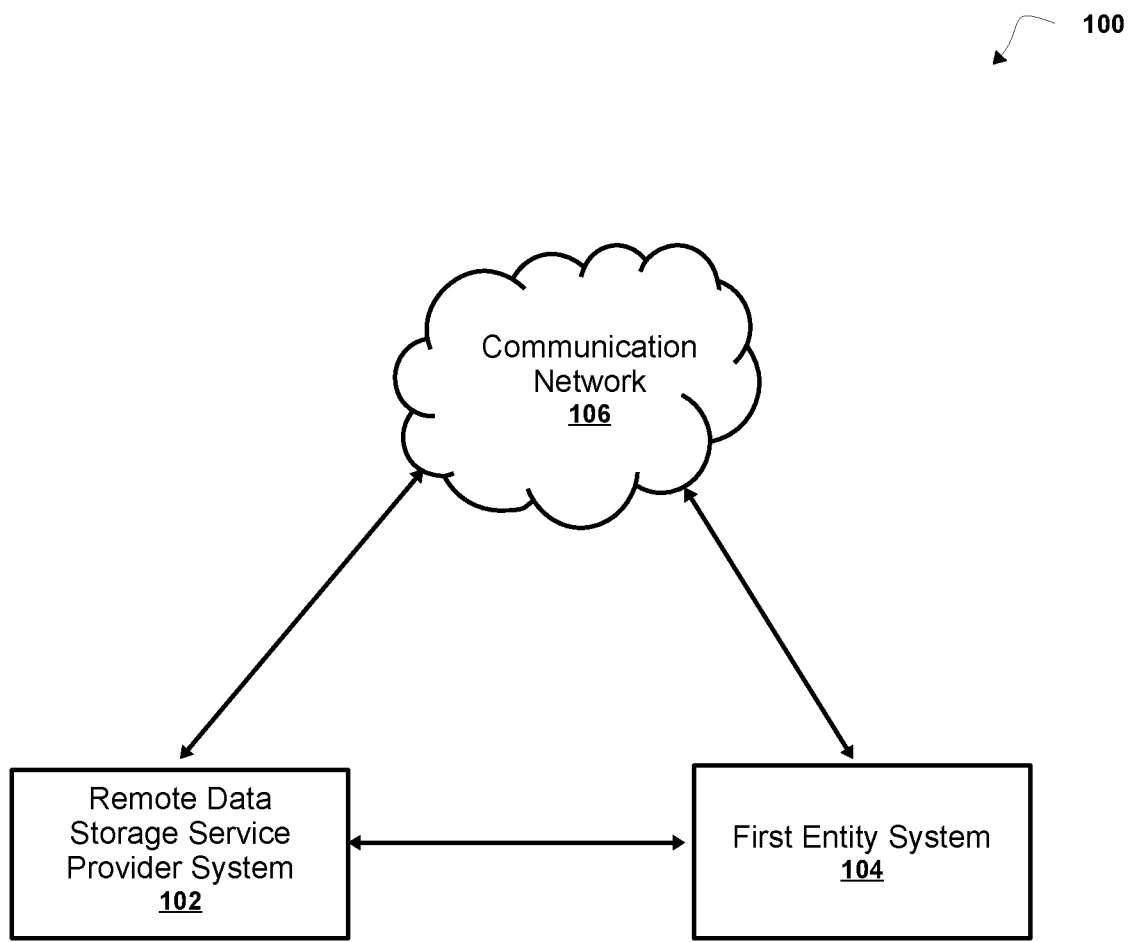
FIG. 1 is a diagram of non-limiting embodiments or aspects of key management environment in which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one."

Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more devices, which may be used by a merchant to conduct a transaction (e.g., a payment transaction) and/or process a transaction. For example, a POS device may include one or more entity devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, the "point-of-sale (POS) system" may refer to one or more entity devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "transaction service provider" may refer to an entity that receives transaction authorization requests from merchants or other entities and provides guarantees of payment, in some cases through an agreement between the transaction service provider and an issuer institution. In some non-limiting embodiments or aspects, a transaction service provider may include a credit card company, a debit card company, a payment network such as Visa®, MasterCard®, American Express®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "client" and "client device" may refer to one or more computing devices that access a service made available by a server. In some non-limiting embodiments or aspects, a "client device" may refer to one or more devices that facilitate payment transactions, such as one or more POS devices used by a merchant. In some non-limiting embodiments or aspects, a client device may include a computing device configured to communicate with one or more networks and/or facilitate payment transactions such as, but not limited to, one or more desktop computers, one or more mobile devices, and/or other like devices.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, and/or the like) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "Payment Card Industry Data Security Standard" (PCI-DSS) may refer to an information security standard for organizations that handle branded credit cards from the major card schemes. The PCI-DSS is mandated by the payment card companies but administered by the Payment Card Industry Security Standards Council.

Many existing applications (e.g., cloud applications, remote applications, distributed applications, etc.) use cryptographic techniques to protect data, to ensure that the parties data is being collected from (or distributed to) are who they are expected to be, and the integrity of the data being processed is assured. Using these cryptographic techniques involves the use of keys to encrypt or decrypt data and create or verify digital signatures. With the proliferation of business applications that use encryption and signature techniques and the vast number of entities (e.g., organizations, clients, customers, merchants, issuers, acquirers, etc.) that need keys to identify themselves, the number of keys in existence in any enterprise can be enormous. Furthermore, keeping track of which key belongs to which entity, which application needs access to which key, and what the usage policies associated with each key should be, can easily get out of hand.

One management technique, known as a key management service (KMS), is a software-only approach that allows an entity to create and manage the encryption keys used to protect sensitive data held in the cloud (e.g., bring your own key (BYOK), etc.). However, encryption keys that reside within the cloud provider's infrastructure, while accessible to the entity, are also accessible to the cloud provider and limited in protection, susceptible to attacks on the cloud provider by hackers or rogue employees, and/or the like. For example, a KSM may be susceptible to memory attacks.

In an example, a cold boot attack or a platform reset attack (e.g., a type of side channel attack in which an attacker with physical access to a computer performs a memory dump of a computer's random access memory (RAM) by performing a hard reset of the target machine, etc.) is typically used to maliciously retrieve encryption keys from a running operating system and relies on the data remanence property of dynamic random access memory (DRAM) and static random access memory (SRAM) to retrieve memory contents that remain readable after power has been removed. Thus, an attacker with physical access to a running computer can execute an attack to find sensitive data, such as the keys, of an entities data that is stored by a cloud provider. Accordingly, a KMS, by itself, may not provide a level of security capabilities for protecting an ever-increasing number of keys, and an ever-increasing value of data, and may not comply with industry standards required for many applications (e.g., PCI-DSS), may be limited to working only within the cloud provider's environment, and in the amount of control an entity may hold with respect to their data when it is resident in a service provided by a cloud provider. This makes the feasibility of this approach problematic, particularly, for entities needing to manage encryption keys across multiple, disparate regions, countries, or services. Additionally, when both encryption keys and data are held by the same entity, the cloud provider, in this instance, there's an added level of risk.

A hardware security module (HSM) may also be used to provide heightened security for on-premise encryption key management, however, widespread cloud deployment makes installing and maintaining HSMs in connection with multi-cloud environments impractical, such as, for example, security and processing problems and inefficiencies inherent to continuously communicating keys between an entity and a cloud, or alternatively encrypted data. As an alternative, some cloud providers have begun provisioning HSMs of their choice in their own data centers (e.g., Google, Amazon Web Services (AWS), etc.) or offering HSMs as a service, to strengthen their KMS offering and underpin their KMS with HSMs that they locate and control in their data centers. While this approach provides a better level of encryption key security, the combination of KMS and HSM can only work exclusively within the cloud provider's region and still has the disadvantage of keeping keys and data stored in the same environment, providing less visibility and knowledge of key usage, remain under the control of a cloud provider after separation, may require increasing numbers of communications, a decrease in performance, and do not support multi-cloud and other remote operations.

Provided are improved systems, methods, and computer program products for controlling encrypted data in remote or distributed systems by multi-party computations (MPC) to provide secure key management. In some non-limiting embodiments or aspects, a system, such as a remote data storage service of a cloud provider, may include at least one processor programmed or configured to receive a request for data stored as encrypted data by the remote data storage service, the request initiated by a first entity, transmit, to an MPC server controlled by the first entity, an MPC request, receive an MPC response from the first MPC server including a secret generated by a secure cryptoprocessor, and decrypt the stored encrypted data based at least partially on the MPC response.

According to the systems, methods, and computer program products described herein, a first entity (e.g., an organization, entity, and/or the like) may store data that is sensitive and/or that is encrypted at a remote data storage service provider system and control access to the data by one or more other systems (e.g., by the remote data storage service provider system itself). Such data may be encrypted and, should the first entity no longer request or require storage of the data at the remote data storage service provider system, the first entity may refuse to perform one or more computations in an MPC protocol, thereby preventing the remote data storage service provider system to decrypt the data (e.g., in response to a request for the data from another system). In this way, the system provides an HSM that may remain under the control of an entity and may be provisioned and physically controlled by the entity to provide the inherent benefits and includes scalability, high availability, and low latency, which makes them a flexible option for entities with high levels of growth, while still allowing a KMS of a cloud provider to secure data using a specified key, and/or provides a capability to more efficiently operate outside of a cloud provider's environment, such as, to manage encryption keys in multi-cloud environments, and extend globally to multiple, disparate regions and countries. In this way, entities can maintain the security level provided by on-premise HSMs while securely taking advantage of the resources and services offered by cloud providers and may provide control of transactions and services for entities employing multi-cloud environments, hybrid cloud environments, or globally operated environments in a streamlined, and accessible solution, while maintaining encryption keys separate from the encrypted data, and/or efficiently operating with an added level of protection from data breaches while reducing latency Additionally, the system may allow encryption keys and data to be stored separate to reduce the possibility of a damaging data breach and may allow entities to not only know where all their keys are, but also define who or what applications can perform with any particular function, increasing speed, while optimizing throughput, latency, accuracy, and reducing computations and exposure of security keys. Furthermore, in some non-limiting embodiments or aspects, a person or application requesting access to an encryption key can be confidently identified, and the policy (what they can do with the key) can be securely enforced, such that unauthorized usage can be restricted, or authorized usage quickly and efficiently removed.

Referring now to FIG. 1, FIG. 1 is a diagram of an example environment 100 in which devices, systems, and/or methods, described herein, may be implemented. As shown in FIG. 1, environment 100 includes first entity system 104, remote data storage service provider system 102, and communication network 106. First entity system 104 and remote data storage service provider system 102 may interconnect (e.g., establish a connection to communicate and/or the like) via wired connections and/or wireless connections.

First entity system 104 may include one or more devices capable of being in communication with remote data storage service provider system 102 via communication network 106. For example, first entity system 104 may include a computing device, such as a mobile computing device (e.g., a smartphone, a tablet, and/or the like), a server (e.g., a transaction processing server), a group of servers, and/or other like devices. In some non-limiting embodiments or aspects, first entity system 104 may also be capable of communicating via a short range wireless communication connection (e.g., an NFC communication connection, an RFID communication connection, a Bluetooth® communication connection, and/or the like). In some non-limiting embodiments or aspects, first entity system 104 may be associated with a transaction service provider and/or a payment gateway service provider as described herein. In some non-limiting embodiments or aspects, first entity system 104 may be capable of being in communication with a data storage device, which may be local or remote to first entity system 104. In some non-limiting embodiments or aspects, first entity system 104 may be capable of receiving information from, storing information in, communicating information to, or searching information stored in the data storage device.

Remote data storage service provider system 102 may include one or more devices capable of being in communication with remote data storage service provider system 102 via communication network 106. For example, remote data storage service provider system 102 may include a computing device, such as a mobile computing device (e.g., a smartphone, a tablet, and/or the like), a server (e.g., a transaction processing server), a group of servers, and/or other like devices. In some non-limiting embodiments or aspects, remote data storage service provider system 102 may also be capable of communicating via a short range wireless communication connection. In some non-limiting embodiments or aspects, remote data storage service provider system 102 may be associated with a transaction service provider and/or a payment gateway service provider, as described herein. In some non-limiting embodiments or aspects, remote data storage service provider system 102 may be capable of being in communication with a data storage device, which may be local or remote to remote data storage service provider system 102. In some non-limiting embodiments or aspects, remote data storage service provider system 102 may be capable of receiving information from, storing information in, communicating information to, or searching information stored in the data storage device. In some non-limiting embodiments or aspects, remote data storage service provider system 102 may be associated with a cloud computing service provider, such as, for example, Microsoft Azure®, Google Cloud®, Amazon Web Services®, and/or the like.

Communication network 106 may include one or more wired and/or wireless networks. For example, communication network 106 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Systems disclosed herein may include an MPC protocol to provide security for organizations to have control of access to a key needed for data decryption of data stored at remote data storage service provider system 102. When the organization's unique key is needed, remote data storage service provider system 102 may request, from a local instance of an MPC server (e.g., a computing device hosted by and/or in communication with remote data storage service provider system 102), a first MPC computation (e.g., one MPC computation of a plurality of MPC computations needed to derive a key, etc.), then reach out to a second server with the organization's control outside of the cloud service's access. As a result, the organization may control access to their encrypted data by managing one part of the crypto functions required. If the organization leaves the cloud service (e.g., decides to no longer store data at remote data storage service provider system 102), the organization may remove the MPC server from remote data storage service provider system 102 and/or deny access from the MPC server to remote data storage service provider system 102. As a result, encrypted data associated with the organization may no longer be decrypted (e.g., by remote data storage service provider system 102). This would also protect offline backups, and any test environments (e.g., computing devices, systems, and/or the like) the remote data storage service provider system 102 may have. The systems and methods described herein provide technical assurance that an organization's data cannot be accessed by remote data storage service provider system 102 without authorization from the organization. The systems and methods described herein also provide security for foreign and regional offices where an organization's encrypted data may need to be protected while remaining at a particular location (e.g., at remote data storage service provider system 102 located in one or more domestic locations such as within a country, territory, and/or the like).

In some non-limiting embodiments or aspects, remote data storage service provider system 102 may install an MPC server (e.g., as a local cloud instance) as part of remote data storage service provider system 102. Remote data storage service provider system 102 may then receive and store encrypted data from first entity system 104 and store the data in a database associated with remote data storage service provider system 102. In such an example, first entity system 104 may encrypt the encrypted data prior to transmitting the encrypted data to remote data storage service provider system 102 using an encryption key that is unique to the organization.

In some non-limiting embodiments or aspects, remote data storage service provider system 102 may receive a request for the encrypted data and, based on the request, transmit a request for the unique key from the MPC server. The MPC server may perform a calculation to derive the unique key, then request that a second MPC server (e.g., an MPC server located remote to remote data storage service provider system 102, an MPC server included in first entity system 104, and/or the like) perform one or more calculations and transmit the results to the MPC server. In some non-limiting embodiments or aspects, the second MPC server may be within the organization's control and/or outside of the control (e.g., not included in) of remote data storage service provider system 102. If only two MPC servers are included in an environment (e.g., environment 100), then data associated with the encryption key (e.g., a computation performed by the second MPC server as part of an MPC protocol) is returned to remote data storage service provider system 102 and remote data storage service provider system 102 may then generate a key to decrypt the encrypted data. The key may be generated based on data received from the first MPC server and the second MPC server. The organization could dictate the number of MPC servers needed to derive the unique key, and the computation process may continue to the number of nodes that satisfy the request.

Figure 2:
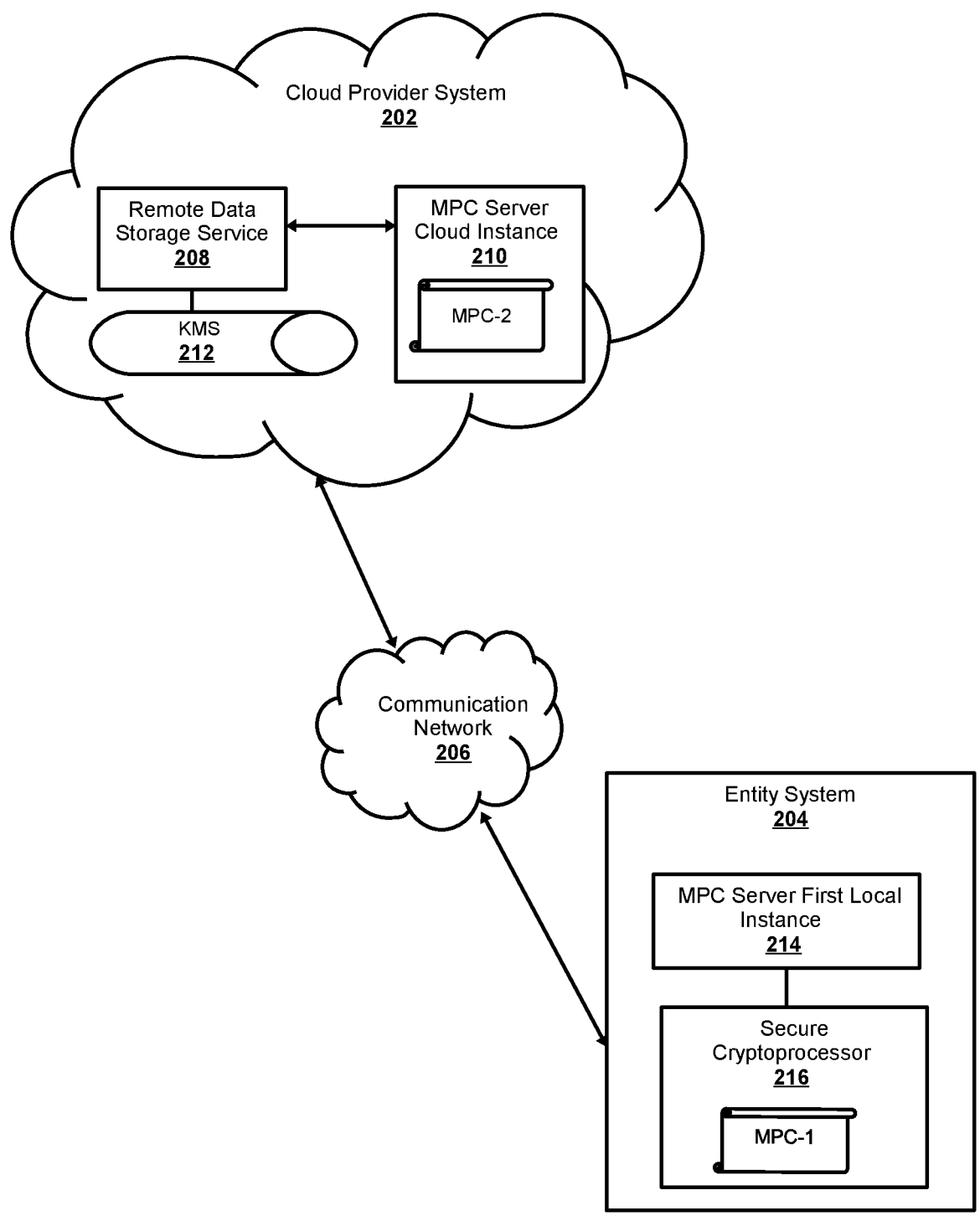
FIG. 2 is a diagram of non-limiting embodiments or aspects in which systems, apparatuses, and/or methods, for secure key management, as described herein, may be implemented.

Referring now to FIG. 2, FIG. 2 is a diagram of an example key management system 200 in which devices, systems, and/or methods, described herein, may be implemented. As shown in FIG. 2, key management system 200 includes cloud provider system 202, entity system 204, and communication network 206. Cloud provider system 202 and entity system 204 may interconnect (e.g., establish a connection to communicate and/or the like) via wired connections and/or wireless connections.

In some non-limiting embodiments or aspects, cloud provider system 202 includes remote data storage service 208 to provide data processing, storage, and retrieval services, or other capabilities for managing data in a remote repository. In addition, data stored by remote data storage service 208 is protected and secured with the help of a data encryption key (DEK). The DEK or master key is an encryption key that may be used by remote data storage service 208 to perform encryption and decryption functions on the data stored by remote data service 208 (e.g., data at rest). The DEK is encrypted by remote data storage service 208 (e.g., one or more processors, clients, or servers of remote data storage service 208, etc.) to protect it from malicious attacks or usage while stored in KMS 212 (e.g., a keys database of KMS 212, key storage of a one or more computing devices of KMS 212, etc.).

In some non-limiting embodiments or aspects, remote data storage service 208 must access or derive a key encryption key (KEK) whose function it is to encrypt and decrypt the DEK. Remote data storage service 208 may utilize KMS 212 to access the DEK. In some non-limiting embodiments or aspects, KMS 212 is the system that houses the key management software and may provide a key management application program interface (KM API) designed to securely retrieve and pass along encryption keys from a key management server to the client requesting the keys. More specifically, KMS 212 provides a software-only approach that allows an entity to create and manage the many data encryption keys used to protect sensitive data held in the cloud (e.g., BYOK, etc.). In some cases, an entity may store hundreds or even thousands of DEKs in a key database residing in the cloud. However, private encryption keys (e.g., DEKs, private keys, symmetric keys, etc.) that reside within cloud provider system 202's infrastructure, while accessible to the entity, are also accessible to the cloud provider and susceptible to threats, attacks, and theft while residing on cloud provider system 202 by hackers or rogue employees. Accordingly, and as explained above, for security and control purposes, the DEK may be further obfuscated while being centrally stored and managed by cloud provider system 202.

In some non-limiting embodiments or aspects, key management system 200 provides a more efficient and scalable way to disperse private keys, by scattering the computations that invoke any given key with an MPC across multiple servers (e.g., computing devices, clients, systems, platforms, etc.). In addition to securing the DEK and, therefore, data that is encrypted with the DEK, the MPC, as described further below, also limits the capabilities of cloud provider system 202, so that it does not have full control of the DEK but, instead, only a portion of the MPC is used to determine the KEK that encrypts and decrypts the DEK.

Continuing with FIG. 2, MPC server cloud instance 210 stores and provides MPC-2 on behalf of cloud provider system 202 when requested by KMS 212 for computing a KEK. In some non-limiting embodiments or aspects, entity system 204 provides the other half of the computation. However, the number of MPCs needed to determine the KEK may be expanded to create a more secure KEK. In some non-limiting embodiments or aspects, entity system 204 is the only additional computation to be stored outside cloud provider system 202, and entity system 204 may provide control to a payment card provider desiring to limit control of sensitive data while residing with cloud provider system 202.

In some non-limiting embodiments or aspects, entity system 204 provides instances of an MPC server that include computations for which the particular instance of the MPC server is responsible to process. For example, entity system 204 provides MPC server first local instance 214 (e.g., a first local instance of an MPC server that includes MPCs, etc.). Alternatively, entity system 204 may provide remote instances, such as, for example, cloud instances that are stored remotely from entity system 204 and, as discussed above, provide more limited security and control from the perspective of the entity providing the MPC.

To further enhance security, entity system 204 computes an MPC in secure communication with secure cryptoprocessor 216, where MPC-1 is stored. Secure cryptoprocessor 216 provides hardware protection to computations and other functions for providing secure MPC. In some non-limiting embodiments or aspects, secure cryptoprocessor 216 is a component of a hardware security module. The HSM provides logical and physical protection of the material, including cryptographic keys. The cryptographic materials handled by HSMs may include asymmetric keys, symmetric keys, elliptic key cryptography, and/or the like.

In some examples, an HSM contains one or more secure cryptoprocessor chips that may prevent tampering and bus probing, or a combination of secure cryptoprocessors and other processor chips (e.g., central processing unit (CPU), general processing unit (GPU), tensor processing unit (TPU), field programmable gateway array (FPGA), application-specific integrated circuit (ASIC), etc.). Therefore, an HSM choice may have a significant impact on speed, throughput, latency, accuracy, rate of learning, energy efficiency, and rate of computations. The HSM includes a module that is protected by the tamper evident, tamper resistant, or tamper responsive packaging.

In some non-limiting embodiments or aspects, onboard secure key management involving the usage of cryptographic keys is only performed in hardware, such that no key (e.g., a whole or entire key, etc.) can be extracted or exported from the HSM in a readable format. The HSM also provides the physical computing device that safeguards and manages the digital keys (e.g., MPC, KEK, DEK, etc.) for strong authentication and provides crypto processing capabilities, even when attached directly to a less secure computing device or network server. The HSM protects the keys, and, if or when an application is ever compromised, although application data being processed in the application at the time may be lost or compromised, the key that could be used to do real harm to an entity (e.g., decrypt in bulk a database, perform fraudulent transactions on a payment processor, etc.) is not compromised. In some non-limiting embodiments or aspects, general purpose HSM, cloud-based HSM, and/or financial transaction HSM (e.g., to verify a personal identification number (PIN) entered at a POS, etc.) may be used, shared, or virtually enabled inside a physical HSM.

In some non-limiting embodiments or aspects, the HSM also provides logic or business applications that can be executed within the HSM and used with any applications employing a digital key, key generation, secure key storage and management, use of crypto graphic data or materials, offloading application servers, transparent database keys management for databases, generate, store, handle key pairs, and/or the like.

In some non-limiting embodiments or aspects, a card payment HSM is used by entity system 204 for MPCs, and may also provide processing of encryption of a PIN entered when reading the card at a POS device, to load a PIN into protected memory, to load keys into protected memory, for key exchange, authorization of an online PIN by comparing with an encrypted block in conjunction with an automated teller machine (ATM) or POS controller, verify a POS or card transaction by checking card security codes or by processing embedded memory blocks (EMB) based transactions, support a crypto API with a smart card, re-encrypt a pin block to send to another HSM or hardware and operating system troubleshooting, support a protocol of POS management, support de facto standards of host key data exchange, generate a PIN, generate data for a magnetic stripe card, and provide secure sockets layer/transport layer security (SSL/TLS) management and acceleration.

In some non-limiting embodiments or aspects, entity system 204 computes an MPC and wraps the result before transmitting a result. For example, entity system 204 wraps MPC-1 (e.g., the result of an MPC computation, that forms a KEK, a secret piece of a KEK, a secret associated with a KEK, a PIN associated with a KEK, a computation associated with a KEK, a code associated with a KEK, a token, etc.), while MPC-1 remains internal to secure cryptoprocessor 216. In such an example, secure cryptoprocessor 216 wraps a result of the computation with another key before it is transmitted from secure cryptoprocessor 216. For example, secure cryptoprocessor 216 wraps MPC-1 with a transient layer of encryption based on a public key or a private key of a public/private key pair. In this way, MPC-1 is never transmitted from the HSM in the clear and can be safely stored offline before sending to cloud provider system 202. In some examples, MPC-1 is wrapped and transmitted to the cloud service where it can be unwrapped with a corresponding public key or a private key of a public/private key pair before it is used in combination with MPC-2 to derive a KEK. In this way, cloud provider system 202 can provide cloud encryption (e.g., server side encryption, etc.) such that data of entity system 204 is uploaded, and encrypted while it is being stored and supposed insiders of a cloud service are not be able to access the data (e.g., a request to access the data requires multiple parties, including at least one or more parties besides the cloud service to compute the KEK needed to access and/or decrypt the DEK. After, the DEK is used to perform decryption of the data which can be sent back in the clear or wrapped before moving with a transient layer of encryption based on a transient key. In an alternative example, data of entity system 204 is encrypted before the cloud service obtains access to it. In such a case, the DEK is used to decrypt the data in the cloud being managed by cloud provider system 202 (e.g., KMS in AWS, etc.) and then wrapped before with a public key of entity system 204, or alternatively, the DEK is wrapped with a public key of entity system 204 to securely protect it before it is accessed or transmitted.

Figure 3:
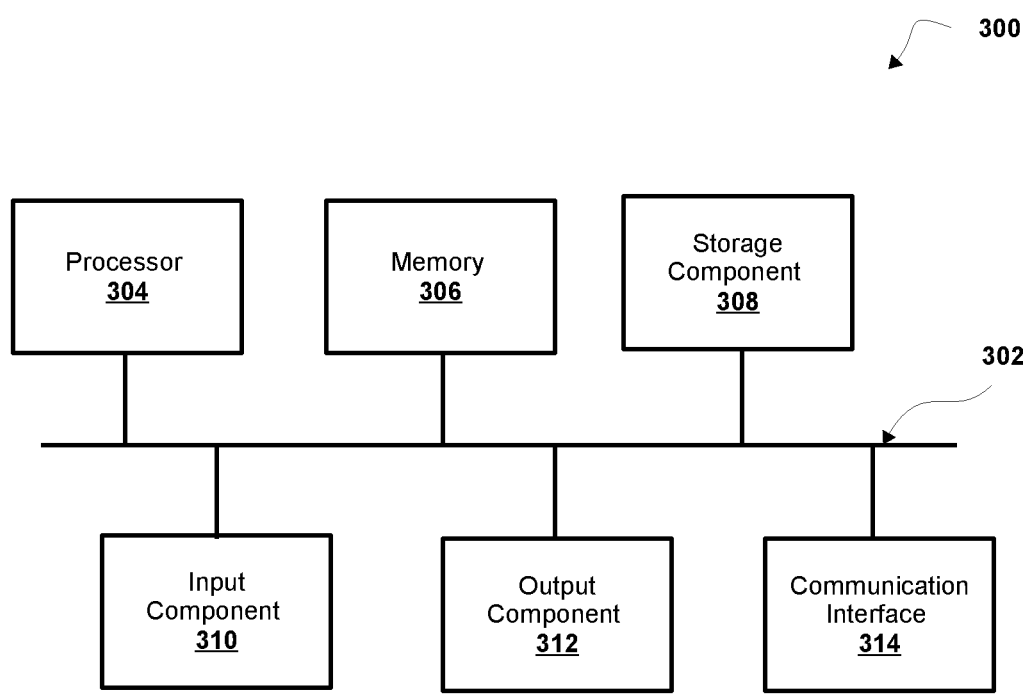
FIG. 3 is a diagram of non-limiting embodiments or aspects of components of one or more devices of FIG. 1.

Referring now to FIG. 3, FIG. 3 is a diagram of example components of a device 300. Device 300 may correspond to one or more devices of first entity 104, remote data storage service provider system 102, and/or communication network 106. In some non-limiting embodiments or aspects, first entity system 104, remote data storage service provider system 102, and/or communication network 106 may include at least one device 300 and/or at least one component of device 300. As shown in FIG. 3, device 300 may include bus 302, processor 304, memory 306, storage component 308, input component 310, output component 312, and communication interface 314.

Bus 302 may include a component that permits communication among the components of device 300. In some non-limiting embodiments or aspects, processor 304 may be implemented in hardware, software, or a combination of hardware and software. For example, processor 304 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like) that can be programmed to perform a function. Memory 306 may include a random access memory (RAM), a read-only memory (ROM), and/or another type of dynamic or static storage device (e.g., a flash memory, a magnetic memory, an optical memory, and/or the like) that stores information and/or instructions for use by processor 304.

Storage component 308 may store information and/or software related to the operation and use of device 300. For example, storage component 308 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 310 may include a component that permits device 300 to receive information, such as via user input (e.g., a touch screen display, a keyboard, a keypad, a mouse, a button, a switch, a microphone, and/or the like). Additionally or alternatively, input component 310 may include a sensor for sensing information (e.g., a global positioning system (GPS) component, an accelerometer, a gyroscope, an actuator, and/or the like). Output component 312 may include a component that provides output information from device 300 (e.g., a display, a speaker, one or more light-emitting diodes (LEDs), and/or the like).

Communication interface 314 may include a transceiver-like component (e.g., a transceiver, a separate receiver and transmitter, and/or the like) that enables device 300 to communicate with other devices, such as via a wired connection, a wireless connection, or a combination of wired and wireless connections. Communication interface 314 may permit device 300 to receive information from another device and/or provide information to another device. For example, communication interface 314 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 300 may perform one or more processes described herein. Device 300 may perform these processes based on processor 304 executing software instructions stored by a computer-readable medium, such as memory 306 and/or storage component 308. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 306 and/or storage component 308 from another computer-readable medium or from another device via communication interface 314. When executed, software instructions stored in memory 306 and/or storage component 308 may cause processor 304 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 3 are provided as an example. In some non-limiting embodiments, device 300 may include additional components, fewer components, different components, or differently arranged components than those shown in FIG. 3. Additionally or alternatively, a set of components (e.g., one or more components) of device 300 may perform one or more functions described as being performed by another set of components of device 300.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Figure 4:
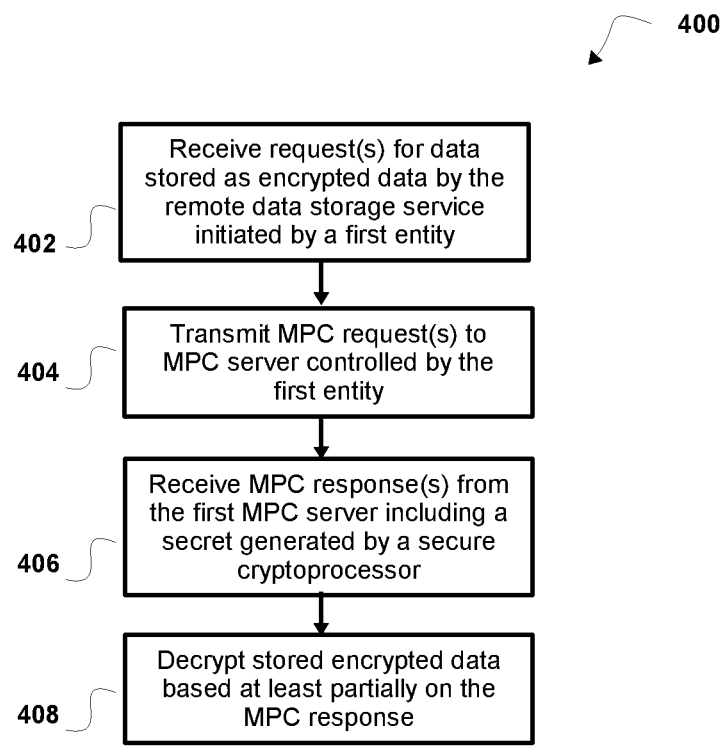
FIG. 4 is a flowchart illustrating non-limiting embodiments or aspects of a method for secure key management according to the principles of the present disclosure.

Referring now to FIG. 4, FIG. 4 is a flowchart of a non-limiting embodiment or aspect of process 400 for secure key management. In some non-limiting embodiments or aspects, one or more of the steps of process 400 for secure key management may be performed (e.g., completely, partially, and/or the like) by cloud provider system 202 (e.g., one or more devices of cloud provider system 202). In some non-limiting embodiments or aspects, one or more of the steps of process 400 may be performed (e.g., completely, partially, and/or the like) by entity system 204 (e.g., one or more devices of entity system 204).

As shown in FIG. 4, at step 402, process 400 may include receiving a request for data stored as encrypted data by remote data storage service 208 initiated by a first entity. For example, cloud provider system 202 receives a request for data stored as encrypted data by remote data storage service 208, the request initiated by a first entity.

In some non-limiting embodiments or aspects, the stored encrypted data includes a master key determined by decrypting the stored encrypted data with a derived key based on the MPC response and the second MPC response to determine the master key associated with the first entity in remote data storage service 208. For example, the encrypted data is stored by KMS 212 as a database of encryption keys (e.g., a database having one or more encrypted DEKs, etc.), and at least one of the encryption keys is decrypted based on the MPC response.

As shown in FIG. 4, at step 404, process 400 may include transmitting MPC request(s) to MPC server controlled by the first entity. For example, cloud provider system 202 transmits to an MPC server (e.g., MPC server first local instance 214, etc.) controlled by the first entity, an MPC request. In some non-limiting embodiments or aspects, cloud provider system 202 first transmits to MPC server first local instance 214, and, in response to a request, receives an MPC response from the particular MPC server first local instance 214 of the MPC server, in the alternative, the request may invoke return MPC responses from one or more instances of an MPC server instantiated in MPC server first local instance 214 (e.g., a first MPC server local instance, a second MPC server local instance, a third MPC server local instance, etc.) of the first entity, and the KMS 212 or MPC server cloud instance 210 may determine messages for an MPC. In some examples, the one or more instances of the MPC server may transmit a secret that contributes toward the MPC for deriving a KEK to decrypt a DEK for decryption of encrypted data, or to encrypt the data itself in some non-limiting embodiments or aspects.

Cloud provider system 202 transmits to a second MPC server (e.g., MPC server first local instance 214, etc.) controlled by remote data storage service 208, an MPC request for an MPC response that provides a computation generated by MPC server first local instance 214 that may contribute to the MPC of the derived KEK. For example, cloud provider system 202 receives, from a second MPC server (e.g., MPC server cloud instance 210, etc.) controlled by the cloud provider system 202 (e.g., remote data storage service 208, etc.), a second MPC response. The MPC response may include a secret (e.g., a result of a computation, etc.), that is used first to decrypt, and then the MPC request is sent to entity system 204. In this way, entity system 204 may decrypt the DEK by sending an MPC response. If the entity system 204 decides not to decrypt the DEK, or has not decided to decrypt the DEK, entity system 204 may not send an MPC response. Until the MPC response is received, the DEK will not be available.

In some non-limiting embodiments or aspects, if entity system 204 does not provide a response, it receives no secret computation to encrypt the stored encrypted data from remote data storage service 208.

In some non-limiting embodiments or aspects, the MPC request is transmitted by the second MPC server (e.g., MPC server cloud instance 210, etc.) to the first MPC server, the MPC request sent after the MPC server cloud instance 210 has sent a response to the KMS 212. Other examples may include an MPC request routed to the first entity through the KMS 212 of remote data service 208.

As shown in FIG. 4, at step 406, process 400 may include receiving MPC response(s) from the first MPC server including a secret generated by a secure cryptoprocessor. For example, cloud provider system 202 receives an MPC response from the first MPC server including a secret generated by a secure cryptoprocessor (e.g., secure cryptoprocessor 216, an HSM, etc.).

In some non-limiting embodiments or aspects, cloud provider system 202 transmits to a first MPC server and receives an MPC response from one or more instances of the MPC server (e.g., a first local instance, a second local instance, a third local instance, etc.). In some examples, the one or more instances of the MPC server may transmit a secret that contributes toward the decryption of encrypted data.

In some non-limiting embodiments or aspects, the secret is a secret piece of information generated based on an MPC, and may include one of a key, a code, a token, a pin, a computation, or a password.

The second server may be controlled by cloud provider system 202, or alternatively, may be controlled by another entity, such as entity system 204. Cloud provider system 202 may also receive MPC responses from a second MPC server that is not controlled by entity system 204 nor cloud provider system 202. For example, a second server may be controlled by an entity controlling a transaction terminal, an issuer bank, or an acquirer bank, a merchant, a transaction handler, that is configured to generate and transmit a second MPC response.

The secret is wrapped with a transient layer of encryption based on a transient key while being generated by the secure cryptoprocessor. For example, a crypto function happens inside the HSM, and the other advantage is that it can hide a level of exposure. If someone were to access one of the nodes, the key is inaccessible when it is protected by an HSM. Other benefits of the HSM are that multiple functions can be executed within the HSM without ever having to expose a key. The HSM may wrap and rewrap a transient layer of encryption on an MPC, secret, or secret key, without ever exposing keys in the clear. Whereas in software systems without HSM, they may be able to gain access. Software cannot encrypt anything without loading the keys into memory.

As shown in FIG. 4, at step 408, process 400 may include decrypting stored encrypted data based at least partially on the MPC response. For example, cloud provider system 202 using KMS 212 decrypts stored encrypted data based at least partially on the MPC response.

In some non-limiting embodiments or aspects, the stored encrypted data is decrypted within a predetermined period. For example, the MPC response is configured to remain active for a period not exceeding the predetermined period to minimize exposure. The MPC response includes secret information that may be a security threat if not deactivated. The MPC response may be programmed or configured to deactivate within a predetermined period (e.g., a 30 minute period, a period of inactivity longer than a predetermined threshold, etc.). The MPC response is configured to remain active for a period not exceeding the predetermined period to minimize exposure to threats of a crypto attack or hack, or alternatively, is configured to deactivate if not used to decrypt for longer than a predetermined period.

The MPC response is used to decrypt the stored encrypted data without revealing any information about the MPC request or the MPC response, and wherein the MPC response is configured to remain active for a period not exceeding the predetermined period to minimize exposure. In some non-limiting embodiments or aspects, the KMS is configured to determine a predetermined period for which the MPC response can remain active.

In some non-limiting embodiments or aspects, stored encrypted data is decrypted based at least partially on the second MPC response that has been generated by a second server. However, in addition to entity system 204 contributing entities may, in some non-limiting embodiments or aspects, participate in the MPC, such as an entity controlling a transaction terminal, an issuer bank, or an acquirer bank, a merchant, a transaction handler, that may be configured to generate and transmit a second MPC response. The combination of the second entities may be used to encrypt and decrypt shared data, for example, in a transaction database (e.g., data shared by the merchant and the issuer, data shared by the POS and the acquirer, data shared by the POS with the transaction handler, and/or the like. The DEK is first decrypted with a combination of keys (merchant/transaction handler), for purposes of sharing data from the merchant to the issuer. Subsequently (e.g., to the first decryption), data is encrypted with a combination of keys (transaction handler/ issuer), providing access to the issuer to transaction information or other transaction data.

Figure 5:
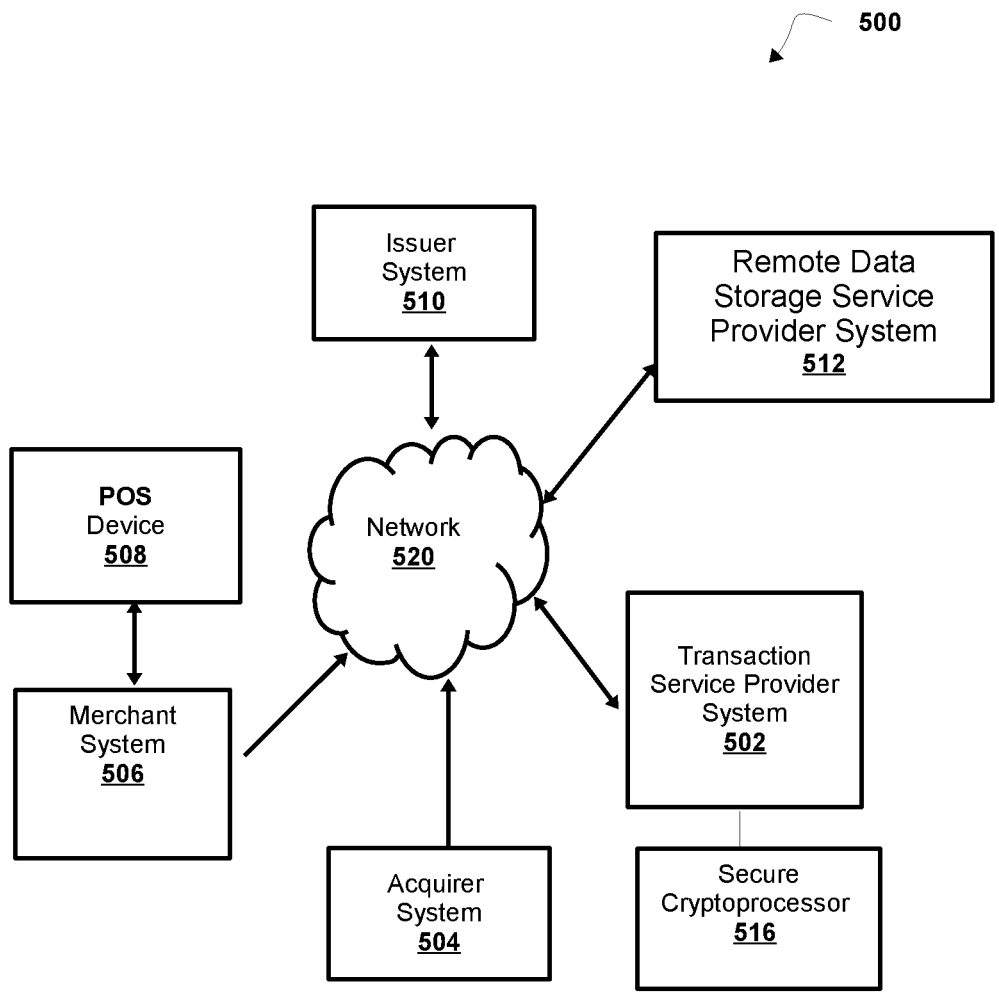
FIG. 5 is a diagram of non-limiting embodiments or aspects of secure key management for a payment transactional system.

Referring now to FIG. 5, FIG. 5 is a flowchart of a non-limiting embodiment or aspect of a process 500 for secure key management. In some non-limiting embodiments or aspects, one or more of the steps of process 500 for secure key management may be performed (e.g., completely, partially, and/or the like) by transaction service provider system 502 (e.g., one or more devices of transaction service provider system 502), acquirer system 504 (e.g., one or more devices of acquirer system 504), merchant system 506 (e.g., one or more devices of merchant system 506), POS device 508 (e.g., one or more devices of POS device 508), issuer system 510 (e.g., one or more devices of issuer system 510), or remote data storage service provider system 512 (e.g., one or more devices of remote data storage service provider system 512), all connected via network 520.

In FIG. 5, transaction service provider system 502 (e.g., transaction handler connected to remote data storage service, etc.) is coupled between issuer system 510 (e.g., an issuer processor) and acquirer system 504 (e.g., acquirer processor, etc.) to facilitate authorization and settlement of transactions between a consumer account from POS device 508 and a merchant account of merchant system 506. The transaction handler records the transactions in the remote data storage. A service (e.g., a portal interface is coupled to the data warehouse to provide information based on the transaction records, such as the transaction profiles, aggregated spending profile, offer redemption notification, etc.). The portal may be implemented as a web portal, a telephone gateway, a file/data server, and/or the like.

In some non-limiting embodiments or aspects, the transaction handler receives a transaction from the merchant system with payment card information that is transmitted via a gateway. Transaction service provider system 502 determines types and kinds of information needed to complete the transaction, and keys are exchanged with issuer system 510 (e.g., issuing bank, etc.). In such an example, instead of requiring multiple messages between the POS device 508, transaction service provider system 502, acquirer system 504, and issuer system 510, the POS device 508 includes an MPC that to encrypt with an asymmetric key and sends to acquirer system 504 which includes an HSM.

In some non-limiting embodiments or aspects, merchant system 506 and acquirer system 504 share an MPC with multiple devices from multiple transactions and reduce the need for HSMs by using a shared HSM to access their transactional data in a remote data repository. When the KEK is used on data at rest, or in a KMS, the KEK is wrapped with a public key of the host, transaction service provider system 502, and have no risk of exposure of a key in the clear, or alternatively, multiple keys, a KEK could remove the HSM from the software at the front, transaction service provider system 502 receives it in the MPC node with two MPCs, unwrap and use to move it in a different database that can be shared with issuer system 510.

In some non-limiting embodiments or aspects, both the merchant and the issuer use MPC would have two separate nodes. A transaction could come from merchant system 506 through software defined MPC for secure cryptoprocessor 516 of transaction service provider system 502 (e.g., an HSM of a transaction handler). In one example, the transaction includes a pin block, transaction service provider system 502 provides the 2nd MPC to decrypt the pin block, while the first is with merchant system 506, which can then encrypt with another key and send it down to issuer system 510. Merchant system 506 could then decrypt using an MPC and send back a response.

Multiple instances of MPC servers are available, and in some non-limiting embodiments or aspects, could have more than one instance, such that a quorum is considered when multiple instances of a server are used (e.g., a predetermined number of MPC server instances). To have a quorum does not require multiple instances of the server to communicate to the original office. The quorum may eliminate the original office.

When the original office is in a foreign country, an instance of an MPC Server in the original office can be denied communications, thereby, effectively placing the data in a protected condition for an indefinite period of time. For example, key management services that are initially provided for multiple colocation key centers including a foreign data center, are denied to the foreign data center when colocation is compromised, to protect the data by making it inaccessible while determining a threat. Domestic processing may keep things separate while using MPC to transmit the encrypted data back and forth. In such an example, a local MPC encrypts a portion then the global data center decrypts the rest of it. If using multiple instance of a server, then only 2 of 3 may be needed to decrypt the domestic data, or alternately, other ratios of server instances or configurations depending on requirements and risks.

Remote data storage service 208 is configured to decrypt based on a predetermined number of MPC responses of the first entity. Remote data storage service 208 is configured to transmit one or more MPC requests to a plurality of MPC servers (e.g., instances, virtual copies, etc.) associated with entity system 204. As such, accuracy of a security measure is increased, and the number of computations and exposure of security keys is reduced.

In some non-limiting embodiments or aspects, remote data storage service 208 determines an MPC after receiving one or more MPC responses from the plurality of MPC servers, wherein the stored encrypted data is decrypted based on the received MPC responses satisfying the predetermined number of MPC responses.

In some non-limiting embodiments or aspects, stored encrypted data is decrypted based at least partially on the second MPC response that has been generated by a second server controlled by an entity controlling a transaction terminal, an issuer bank, or an acquirer bank, a merchant, a transaction handler, that is configured to generate and transmit a second MPC response.

Figure 6:
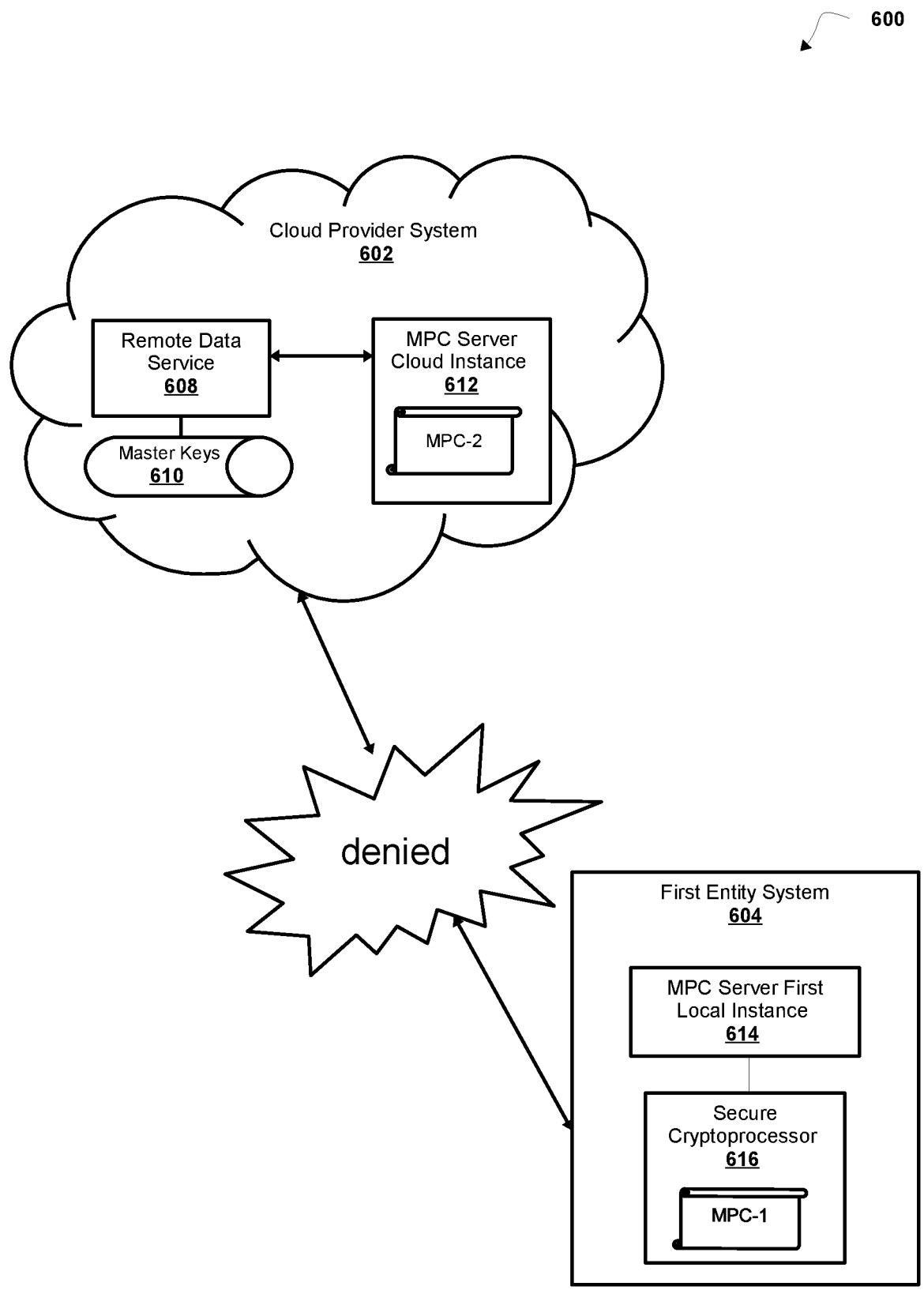
FIG. 6 is a diagram of an implementation of non-limiting embodiments or aspects of a process for removing rights to a secure key.

Referring now to FIG. 6, FIG. 6 is a flowchart of a non-limiting embodiment or aspect of a process 600 for removing a data repository encrypted with an MPC of an entity. In some non-limiting embodiments or aspects, one or more of the steps of process 600 for removing a data repository may be performed (e.g., completely, partially, and/or the like) by cloud provider system 602 (e.g., one or more devices of cloud provider system 602), first entity system 604 (e.g., one or more devices of first entity system 604), communication network 606 (e.g., one or more devices of communication network 606), remote data storage service 608 (e.g., one or more devices of remote data storage service 608), master keys 610 (e.g., one or more devices of master keys 610), MPC server cloud instance 612 (e.g., one or more devices of MPC server cloud instance 612), MPC server first local instance 614 (e.g., one or more devices of MPC server first local instance 614), and secure cryptoprocessor 616 (e.g., one or more devices of secure cryptoprocessor 616).

In some non-limiting embodiments or aspects, the first entity determines to prevent the remote data storage service 608 from decrypting the stored encrypted data of the first entity. As shown in FIG. 6, the first entity system 604 denies (e.g., stops communicating an MPC response, etc.) an MPC request/response connection. This may occur simultaneous to a data move, or a connection may be blocked to stop communication of the MPC request and the MPC response.

The denial may block at least one of a subsequent MPC request from remote data storage service 608, a subsequent MPC response to remote data storage service 608, or a connection between remote data storage service 608 and an MPC server of first entity system 604. Accordingly, a DEK may not be accessed and computations are not completed or effective to decrypt the entire DEK.

In some non-limiting embodiments or aspects, when binding to the HSM, the MPC provides an efficient and effective means to allow an entity for shutting down the node to block crypto functions from executing in a cloud provider because the cloud provider cannot reach the HSM. In such an example, entity system 604 receives a technical assurance that cloud provider system 602 cannot access data unless they have the VISA portion of the key, while decreasing the number of computations and communications needed. As such, effectiveness of a security measure is increased, and the number of computations and exposure of security keys is reduced.

Although the above systems, methods, and computer program products have been described in detail for the purpose of illustration based on what is currently considered to be the most practical and preferred embodiments, it is to be understood that such detail is solely for that purpose and that the present disclosure is not limited to the described embodiments but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method, comprising:
   receiving, by a remote data storage service, a request for data stored as encrypted data by the remote data storage service, the request initiated by a first entity;
   transmitting, to a first multi-party computation (MPC) server controlled by the first entity, an MPC request;
   receiving an MPC response from the first MPC server including a cryptographic response generated by a secure cryptoprocessor for determining decryption authorization;
   decrypting, by the remote data storage service, the stored encrypted data based at least partially on the MPC response from the first entity, wherein decrypting the stored encrypted data further comprises:
   computing a derived key upon request as part of an MPC process, the derived key being cryptographically bound to the first entity, the remote data storage service, and the cryptographic response generated by the secure cryptoprocessor;
   obtaining a master key by decrypting a data encryption key in the remote data storage service with the derived key, wherein access to the data encryption key is based on approval by multiple independent parties; and
   decrypting, by the remote data storage service with the master key, data hosted by the remote data storage service associated with the first entity; and
   preventing decryption by denying the MPC response, blocking cryptographic functions, or restricting access to a key management system based on an action initiated by the first entity.

2. The computer-implemented method of claim 1, further comprising:
   receiving, from a second MPC server controlled by the remote data storage service, a second MPC response, wherein the stored encrypted data is decrypted based at least partially on the second MPC response.

3. The computer-implemented method of claim 2, wherein the MPC request is transmitted to the first MPC server in response to receiving the second MPC response.

4. The computer-implemented method of claim 3, wherein the MPC request is transmitted by the second MPC server to the first MPC server.

5. The computer-implemented method of claim 1, wherein the stored encrypted data is decrypted within a predetermined period without revealing any information about the MPC request or the MPC response, and wherein the MPC response is configured to remain active for a period not exceeding the predetermined period to minimize exposure.

6. The computer-implemented method of claim 1, wherein the cryptographic response includes a key, a code, a token, a pin, a computation, or a password, and the method further comprises receiving, from a second MPC server controlled by one of a transaction terminal, an issuer bank, or an acquirer bank, a second MPC response, and wherein the stored encrypted data is decrypted based at least partially on the second MPC response.

7. The computer-implemented method of claim 1, wherein the remote data storage service is configured to decrypt based on a predetermined number of MPC responses of the first entity, wherein the method further comprises:
transmitting one or more MPC requests to a plurality of MPC servers associated with the first entity; and
determining an MPC after receiving one or more MPC responses from the plurality of MPC servers, wherein the stored encrypted data is decrypted based on the received MPC responses satisfying the predetermined number of MPC responses.

8. The computer-implemented method of claim 1, further comprising:
determining, by the first entity, whether to prevent the remote data storage service from decrypting the stored encrypted data of the first entity; and
blocking at least one of a subsequent MPC request from the remote data storage service, a subsequent MPC response to the remote data storage service, or a connection between the remote data storage service and an MPC server of the first entity to prevent decryption.

9. The computer-implemented method of claim 1, wherein the cryptographic response is wrapped with a transient layer of encryption based on a transient key while being generated by the secure cryptoprocessor.

10. A system for secure key management, comprising:
at least one processor programmed or configured to:
receive, by a remote data storage service, a request for data stored as encrypted data by the remote data storage service, the request initiated by a first entity;
transmit, to a first multi-party computation (MPC) server controlled by the first entity, an MPC request;
receive an MPC response from the first MPC server including a cryptographic response generated by a secure cryptoprocessor for determining decryption authorization;
decrypt, by the remote data storage service, the stored encrypted data based at least partially on the MPC response, wherein the remote data storage service decrypts the stored encrypted data by:
computing a derived key upon request as part of an MPC process, the derived key being cryptographically bound to the first entity, the remote data storage service, and the cryptographic response generated by the secure cryptoprocessor;
obtaining a master key by decrypting a data encryption key in the remote data storage service with the derived key, wherein access to the data encryption key is based on approval by multiple independent parties; and
decrypting, by the remote data storage service with the master key, data hosted by the remote data storage service associated with the first entity; and
preventing decryption by denying the MPC response, blocking cryptographic functions, or restricting access to a key management system based on an action initiated by the first entity.

11. The system for secure key management of claim 10, wherein the at least one processor is further programmed or configured to:
receive, from a second MPC server controlled by the remote data storage service, a second MPC response, wherein the stored encrypted data is decrypted based at least partially on the second MPC response.

12. The system for secure key management of claim 11, wherein the MPC request is transmitted to the first MPC server in response to receiving the second MPC response.

13. The system for secure key management of claim 12, wherein the MPC request is transmitted by the second MPC server to the first MPC server.

14. The system for secure key management of claim 10, wherein the stored encrypted data is decrypted within a predetermined period without revealing any information about the MPC request or the MPC response, and wherein the MPC response is configured to remain active for a period not exceeding the predetermined period to minimize exposure.

15. The system for secure key management of claim 10, wherein the cryptographic response includes a key, a code, a token, a pin, a computation, or a password, and the system is further configured to receive, from a second MPC server controlled by one of a transaction terminal, an issuer bank, or an acquirer bank, a second MPC response, wherein the stored encrypted data is decrypted based at least partially on the second MPC response.

16. The system for secure key management of claim 10, further comprising the first MPC server, the first MPC server comprising a hardware security module configured to generate the MPC response in the secure cryptoprocessor.

17. The system for secure key management of claim 10, wherein the remote data storage service is configured to decrypt based on a predetermined number of MPC responses of the first entity, and wherein the at least one processor is further programmed or configured to:
transmit one or more MPC requests to a plurality of MPC servers associated with the first entity; and
determine an MPC after receiving one or more MPC responses from the plurality of MPC servers, wherein the stored encrypted data is decrypted based on the received MPC responses satisfying the predetermined number of MPC responses.

18. A system comprising:
(a) at least one server computer under control of a data storage service, the at least one server computer in communication with at least one data storage device comprising encrypted data associated with an entity;
(b) a first multi-party computation (MPC) server computer in communication with the at least one server computer, the first MPC server computer under control of the data storage service, the first MPC server computer programmed or configured to: (i) receive, from the at least one server computer, a first MPC request, (ii) generate a first MPC response based on the first MPC request including a cryptographic response generated by a secure cryptoprocessor for determining decryption authorization, and (iii) transmit the first MPC response to the at least one server computer;
(c) a second MPC server computer in communication with the at least one server computer, the second MPC server computer under control of the entity and not controlled by the data storage service, the second MPC server computer programmed or configured to: (i) receive, from the at least one server computer or the first MPC server computer, a second MPC request, (ii)

generate a second MPC response based on the second MPC request, and (iii) transmit the second MPC response to the at least one server computer, wherein the at least one server computer is programmed or configured to decrypt the encrypted data based at least partially on the first MPC response and the second MPC response, and wherein the at least one server computer decrypts the stored encrypted data by:

computing a derived key upon request as part of an MPC process, the derived key being cryptographically bound to the entity, the data storage service, and the cryptographic response generated by the secure cryptoprocessor; and obtaining a master key by decrypting a data encryption key in the at least one server computer with the derived key, wherein access to the data encryption key is based on approval by multiple independent parties; and (d) decrypting, with the master key, data hosted by the at least one server computer associated with a first entity; and wherein the at least one server computer is programmed or configured to prevent decryption by denying the first MPC response, blocking cryptographic functions, or restricting access to a key management system based on an action initiated by the first entity.

* * * * *